April 12, 1966  J. FLICHY  3,245,272
MULTI-DISC SPEED-CHANGING UNIT
Filed June 5, 1962

INVENTOR
JACQUES FLICHY
By Linton and Linton
ATTORNEYS

United States Patent Office 3,245,272
Patented Apr. 12, 1966

3,245,272
MULTI-DISC SPEED-CHANGING UNIT
Jacques Flichy, Paris, France, assignor, by mesne assignments, to Ateliers Metallurgiques de Saint-Urbain, a corporation of France
Filed June 5, 1962, Ser. No. 200,193
Claims priority, application France, June 8, 1961, 864,314; Oct. 31, 1961, 877,511
8 Claims. (Cl. 74—199)

The present invention relates to improvements made in speed-changing units of the multiple friction for use in variable speed transmissions. The unit comprises a driving shaft provided with grooves along which are adapted to slide conical discs, the combined assembly being mounted in the interior of a driving drum which is rigidly coupled to a driven shaft and is provided with internal grooves, there being adapted to slide along said grooves, mounting rings which each have an enlarged portion formed on the inner circular portion thereof and which are interleaved between said discs, means being provided for pressing the stack of discs and rings together and for modifying the distance between the axis of the driving shaft and that of the drum. Friction members are employed.

In speed-changing units of this type as generally used, the driving shaft and the driving drum are eccentric with respect to each other, with the result that the displacement of the driven shaft and of the driving drum in parallel relation to the driving shaft permits the enlarged portions of the rings to penetrate between the discs on one side of the shaft and to be freed from the said discs on the other side, with the result that the driven shaft rotates at a speed which becomes progressively lower than that of the driving shaft as the enlarged portions move nearer to the driving shaft.

Speed-changers of this type which have been known up to the present time have the disadvantage either of only transmitting low power outputs or of being subject to rapid wear of the friction members when transmitting high power outputs. In point of fact, the important problem which arises in the case of all these speed-changers and which has not yet been solved is the lubrication of the friction members which are not readily accessible and nevertheless call both for effective cooling as well as a system of lubrication which permits of movement of the said friction members without wear, but also without any substantial slipping.

The present invention supplies a remedy for these disadvantages by creating a speed-changing unit of the above-mentioned type which is essentially characterized in that an axial passage and radial or oblique passages pass through said driving shaft, and that said radial or oblique passages open into grooves of said driving shaft, means being provided for supplying said axial passage with lubricating fluid.

The friction discs which are fitted in said grooves and the rings which are mounted on the driving drum are accordingly supplied with oil which thus effects at the same time both lubrication and cooling without any loss, and over all the active surfaces of said discs and rings.

In one particularly advantageous form of embodiment of the present invention, deflector rings, which may or may not be tooth-edged, are placed between the discs for the purpose of ensuring the distribution of oil over the entire surface of each disc.

In order to take into account the variations in distance between the friction members as a function of the variations of the speed ratio, the tooth-edged or indented rings must preferably be flexible and made, for example, of a plastic material such as the products of polymerization of tetrafluoroethylene, for example of a material known by the trade name "Teflon."

A further improvement provided by the present invention consists in forming oblique grooves in the bearing surfaces of the driving rings so as to facilitate the circulation of lubricating oil, the direction of inclination of the said grooves being dependent on the direction of rotation.

In accordance with a further improvement provided by the present invention, there is placed between the outer face of the outer disc and the driving shaft, a deflector ring which ensures fluid-tightness of the ends of the grooves while further ensuring the lubrication of the said outer face.

In accordance with yet a further improvement, the distribution of oil over the outer face of the inner disc is ensured by forming oblique passages which open at the extremity of the shaft towards the outer face of said inner disc.

Further characteristic features of the present invention will appear from the description which follows below, reference being made to the accompanying drawing, in which.

Figure 1:
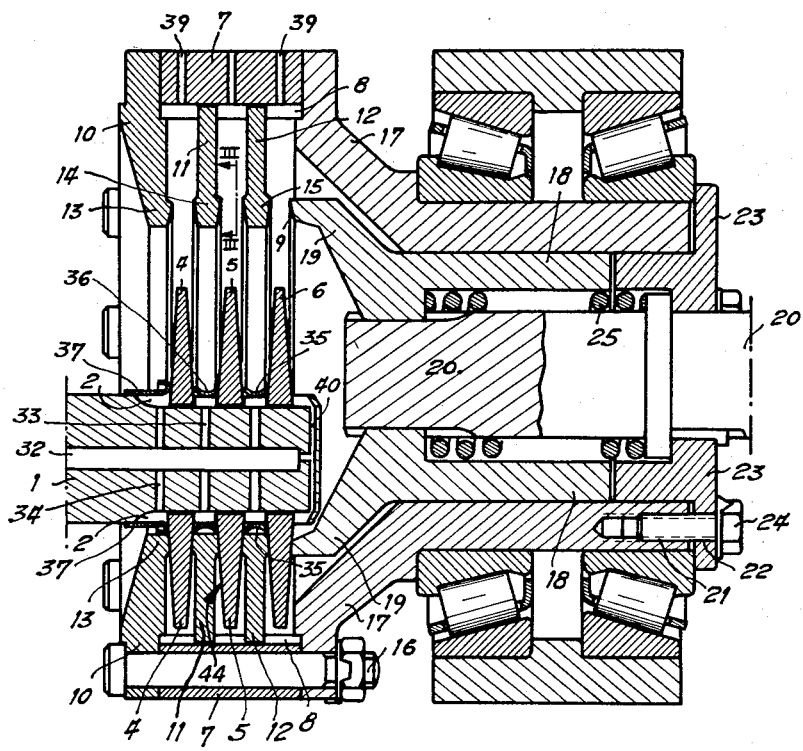
FIG. 1 is a partial cross-section of a speed-changing unit in accordance with the present invention.

The speed-changing unit illustrated in FIG. 1 is essentially constituted by a driving shaft 1 provided with grooves 2 in which are adapted to move serially arranged discs 4, 5, 6 having conical radial cross-sections of which 6 is considered to be the inner disc. A driving drum 7 fitted with an annular cover 10 having an enlarged portion 13, is provided with longitudinal grooves 8 in which are engaged teeth formed at the periphery of rings 11 and 12, there being formed on the internal circular portion of each ring an enlarged portion 14, 15. The cover 10 is also provided with a similar enlargement 13 formed in the internal circular portion thereof.

The driving drum 7 is rigidly secured by means of bolts 16 to a flange member 17 inside which is adapted to slide the tail portion 18 of a clamping or abutting member 19 which is referred to as a "tulip." The said abutting member produces a powerful clamping action between the discs and rings by being brought to bear against these latter directly, or indirectly if an additional ring is fitted against the first disc 6. The tail portion 18 of the abutting member 19 is mounted on the driven shaft 20 and is of relatively substantial length in such manner as to provide a good guiding action. The flange member 17 is provided around the driven shaft with threaded bores 21 which can be made to coincide with orifices 22 formed in a flange 23 which forms a bearing, the two flanges being rigidly assembled together by means of bolts 24 screwed inside the bores 21.

As shown in FIG. 1, the relative position of the two members 19 and 17 varies with the speed ratio, that is to say with the depth of penetration inside the member 17 of the abutting member or "tulip" 19 which moves axially with respect to the driving drum 7. In order to ensure that, in all cases, the edge portion 9 of the "tulip" 19 is forcefully applied against the disc 6, a spring 25 which is housed between the driven shaft 20 and the tail portion 18 bears on the one hand against a shoulder of this latter and, on the other hand, against an annular flange of the driven shaft 20.

The flange member 23 is keyed on the driven shaft 20 so as to permit the driving of this latter by the drum 7.

FIG. 1 shows the system in the stepped-down condition, or low speed ratio. If the driven shaft 20 is displaced by any appropriate means, with respect to the driving shaft 1 and parallel to its own axis, the enlarged portions 14, 15 of the rings 11, 12 move downwards between the discs 4, 5, 6 and the enlargement 13 of the cover 10 serves as a bearing for the disc 4, with the result that the driven shaft 20 rotates at a speed which becomes progressively lower than that of the driving shaft 1 as the enlarged portions move closer to the driving shaft 1. When the driving shaft reaches the line of extension of the driven shaft 20, the said driving shaft transmits its speed entirely to the said driven shaft to which it is accordingly coupled by means of a veritable multi-disc clutch. The system is consequently operating on direct drive.

Any variation in the speed ratio requires an axial displacement of the serially arranged discs 4, 5, 6 with respect to the grooved driving shaft 1, and similarly an axial displacement of the rings 11, 12 with respect to their driving drum 7. In order to make provision for good lubrication and good cooling of the driving elements, there is formed in the driving shaft 1 a longitudinal passage 32 from which lead radial passages 33, 34 . . . which open into the grooves 2. The said radial passages have preferably a fairly large diameter so as to require only a low oil pressure at the entrance of the oil piping system. The lubrication of the discs inside the grooves is thus ensured by means of the oil which is supplied through the said passages.

The distribution of oil over the entire surface of the said discs is carried out by means of deflector rings 35, 36. There is provided at 37 a deflector ring of appropriate elongated shape which is applied on one side against the disc 4 and on the other side against the driving shaft 1 so as to lubricate the outer face of the outer disc 4.

Figure 2:
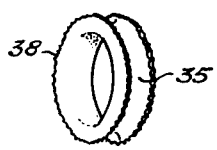
FIG. 2 is a view taken in perspective of a deflector ring in accordance with the present invention.

The rings which have the shape as illustrated in FIG. 2 are preferably indented around their outer rim at 38. In order to take into account the variations in distance between the discs as a function of the variations in the speed ratio, the deflector rings 35, 36, 37, are preferably formed of a flexible material, for example a material such as the products of polymerization of tetrafluoroethylene. The evacuation of oil is effected through passages 39 provided at the periphery of the driving drum 7.

Figure 3:
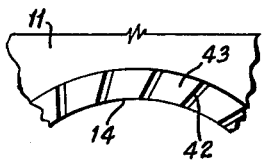
FIG. 3 is a sectional view taken along the line III—III in FIGURE 1, showing the lubricant passageways between the rings and discs.

Finally, there have been provided at 40 substantially radial passages through the shaft 1 which ensure the lubrication of the outer face of the inner disc 6. The substantially radial grooves 42 (FIGURE 3) in the bearing face 43 of the enlarged portion 14, for example, permit the oil to pass between said portion 14 and the axial surface 44 (FIGURE 1) on the disc 5 engaged by said face 43. Similar groove means is provided between the axial surfaces of the discs 4 and 6 and the corresponding bearing surfaces of the portions 9, 13 and 15.

It will be understood that the lubrication and cooling of the apparatus are thus carried out with full effectiveness over all the faces of the discs and rings. Even if no deflector rings were provided, the centrifugal force projects the oil from the center to the periphery, and jets of oil are accordingly supplied to the rings in a rotary motion at a velocity corresponding to the speed of the driving shaft which is different from that of the speed of rotation of the rings. The said rings are thus completely washed by the said oil jets after these latter have already passed over the discs. By reason of the fact that the combined unit forms a cage which encloses the driving shaft, no loss of oil occurs and any oil which is conveyed into the driving shaft is effectively employed both for the purpose of lubrication and for the purpose of cooling.

Lastly, in the case in which no provision is made for deflector rings, there is formed on the inner face of the rings, an accumulation of oil constituting a reserve which is driven progressively towards the contact surfaces by centrifugal force.

The present invention is not limited to the form of embodiment which has been described in detail in the foregoing, but various modifications can be made therein without consequently departing either from the scope or the spirit of the present invention.

What I claim is:

1. A speed-changing unit comprising a driving shaft provided with grooves along which are adapted to slide conical discs, the combined assembly being mounted in the interior of a driving drum which is drivingly coupled to a driven shaft and is provided with internal grooves, there being adapted to slide along said grooves rings which each have an enlarged portion formed on the inner circular portion thereof and which are interposed between said discs, clamping means provided for pressing the stack of discs and rings together and means for modifying the distance between the axis of the drum and the axis of the driving shaft, means defining an axial passage and substantially radial passages communicating with said axial passage and passing through said driving shaft, said substantially radial passges opening into the grooves of said driving shaft, means provided for supplying said axial passage with lubricating fluid, and a tooth-edged deflector ring placed between each pair of adjacent discs.

2. A speed-changing unit, comprising:
   a driving shaft;
   conical disc means nonrotatably and axially slideably supported upon said driving shaft substantially concentric therewith;
   a driven shaft and means rotatably supporting said driven shaft axially parallel with said driving shaft and for relative transaxial movement with respect to said driving shaft;
   drum means and means concentrically coupling said drum means to said driven shaft for rotational movement therewith, said disc means being disposed within said drum means;
   plural, spaced ring means nonrotatably and axially slideably mounted substantially concentrically within said drum means, the inside diameter of said ring means being less than the outside diameter of said disc means and said ring means being interleaved with said disc means, said ring means having annular axial faces close to their radially inner edges engaged with the axial surfaces on said disc means;
   pressure creating means for pressing the disc means and ring means together;
   actuating means for supporting said driving shaft for effecting relative movement of said driving and driven shafts, whereby to effect corresponding relative radial movement of said disc means and said ring means;
   means defining substantially radially extending groove means between the engaging faces of said ring means and surfaces of said disc means; and
   passage means for applying lubricating fluid to the surfaces of said disc means engaged by said faces of said ring means, whereby rotation of said driving shaft causes said fluid to move radially outwardly along said disc means and between the surfaces of said disc means and the faces of said ring means.

3. A speed-changing unit according to claim 2, wherein said grooves are formed in said faces of said rings at spaced intervals.

4. A speed-changing unit according to claim 3, wherein said grooves are inclined in the direction of rotation thereof around the axis of the driving shaft.

5. A speed-changing unit according to claim 2, wherein said driving shaft has lengthwise groove means in the outer surface thereof and said conical disc means have integral key means slideably disposed within said groove means; and wherein said passage means comprises a substantially axial passageway within said driving shaft and a plurality of substantially radially extending passageways communicating between said axial passageway and said groove means.

6. A speed-changing unit according to claim 5, wherein said disc means comprises plural discs and the one of said discs closest to said driven shaft has one axial surface facing said driven shaft;
  wherein said pressure means includes an annular member axially slideably supported upon said driven shaft and having an annular edge surface engaged with said one axial surface of said one disc, and resiliently flexible means connected to said driven shaft and urging said annular edge surface against said one axial surface; and
  wherein at least one of said substantially radial passageways opens radially through said driving shaft between said one axial surface and said driven shaft.

7. A speed changing unit according to claim 2, including an axially elongated deflector ring encircling said driving shaft and located adjacent the axial surface of said disc means remote from said driven shaft.

8. A speed-changing unit according to claim 1, in which said deflector ring is flexible.

References Cited by the Examiner
UNITED STATES PATENTS 2,748,614   6/1956   Weisel _____ 74—200

FOREIGN PATENTS 897,942   11/1953   Germany.
930,064   7/1955   Germany.

BROUGHTON G. DURHAM, *Primary Examiner.*

T. E. SHEAR, *Assistant Examiner.*